United States Patent
Kennedy

(10) Patent No.: US 10,319,058 B2
(45) Date of Patent: Jun. 11, 2019

(54) METHOD FOR APPLYING ADVERTISING MEDIA TO PACKAGING, METHOD OF ADVERTISING, AND SYSTEM FOR APPLYING A COMMUNICATION MEMBER ON A PACKAGING MATERIAL

(71) Applicant: MPT, Inc., Willoughby, OH (US)

(72) Inventor: Michael R. Kennedy, Gates Mills, OH (US)

(73) Assignee: MPT, INC., Willoughby, OH (US)

( * ) Notice: Subject to any disclaimer, the term of this patent is extended or adjusted under 35 U.S.C. 154(b) by 1329 days.

(21) Appl. No.: 14/085,317

(22) Filed: Nov. 20, 2013

(65) Prior Publication Data

US 2014/0137514 A1   May 22, 2014

Related U.S. Application Data

(60) Provisional application No. 61/728,751, filed on Nov. 20, 2012.

(51) Int. Cl.
| | |
|---|---|
| *B65C 5/02* | (2006.01) |
| *G06Q 90/00* | (2006.01) |
| *G06Q 30/02* | (2012.01) |
| *B65D 33/00* | (2006.01) |
| *B65D 5/42* | (2006.01) |
| *B65C 9/28* | (2006.01) |

(Continued)

(52) U.S. Cl.
CPC ............... *G06Q 90/00* (2013.01); *B65C 5/02* (2013.01); *B65C 9/28* (2013.01); *B65D 5/4233* (2013.01); *B65D 33/004* (2013.01); *G06Q 30/02* (2013.01); *G09F 3/10* (2013.01); *B65D 2203/02* (2013.01); *G09F 2003/0202* (2013.01)

(58) Field of Classification Search
CPC .... B65D 33/004; B65D 75/54; B31B 2219/90
USPC ...... 53/135.1, 415; 206/831; 493/34, 75, 78, 493/374, 379, 382
See application file for complete search history.

(56) References Cited

U.S. PATENT DOCUMENTS

| | | |
|---|---|---|
| 3,744,383 A | 7/1973 | Finch et al. |
| 4,120,716 A | 10/1978 | Bonet |
| 4,182,222 A | 1/1980 | Stahl |

(Continued)

OTHER PUBLICATIONS

The Oxford Dictionary of American Usage and Style, 2002, Bryan A Garner, p. 230 (onlined copy submitted, 2 pages).

(Continued)

*Primary Examiner* — Andrew M Tecco
*Assistant Examiner* — Eyamindae C Jallow
(74) *Attorney, Agent, or Firm* — Pearne & Gordon LLP

(57) ABSTRACT

A method of applying a communication member carrying information to a packaging material includes feeding a packaging material in a first direction and applying a communication member to a surface of the packaging material with an adhesive. Both the communication member and the adhesive are simultaneously removable from the packaging material by a user such that substantially no adhesive residue remains on the bag upon communication member removal. A system for applying a communication member on a packaging material that is transported on a packaging material line includes a label applicator and a supply of communication members positioned in communication with the label applicator.

12 Claims, 14 Drawing Sheets

(51) Int. Cl.
*G09F 3/10* (2006.01)
*G09F 3/02* (2006.01)

(56) References Cited

U.S. PATENT DOCUMENTS

| | | | |
|---|---|---|---|
| 4,268,344 A | 5/1981 | Jones | |
| 4,759,742 A | 7/1988 | Achelpohl | |
| 4,883,450 A | 11/1989 | Benoit | |
| 4,909,636 A | 3/1990 | DeMatteis et al. | |
| 4,923,436 A | 5/1990 | Gelbard | |
| 4,997,504 A | 3/1991 | Wood | |
| 5,011,466 A | 4/1991 | DeMatteis et al. | |
| 5,035,515 A * | 7/1991 | Crossman | B65D 33/004 |
| | | | 206/831 |
| 5,282,649 A | 2/1994 | Williams et al. | |
| 5,298,104 A * | 3/1994 | Absher | B31B 19/90 |
| | | | 156/351 |
| 5,335,788 A | 8/1994 | Beasley et al. | |
| 5,363,966 A * | 11/1994 | Czech | B65B 61/202 |
| | | | 206/232 |
| 5,421,803 A | 6/1995 | Kemanjian | |
| 5,464,098 A | 11/1995 | Tseng et al. | |
| 5,816,027 A | 10/1998 | Li | |
| 5,882,118 A | 3/1999 | Daniels et al. | |
| 5,948,586 A | 9/1999 | Hare | |
| 5,967,662 A | 10/1999 | Chew | |
| 6,068,584 A | 5/2000 | Daniels et al. | |
| 6,105,780 A | 8/2000 | Nguyen | |
| RE36,876 E | 9/2000 | Daniels et al. | |
| 6,186,933 B1 | 2/2001 | DeMatteis | |
| 6,269,950 B1 | 8/2001 | Nguyen | |
| 6,767,317 B2 | 7/2004 | Simhaee | |
| 6,773,162 B2 | 8/2004 | Daniels et al. | |
| 6,840,676 B2 | 1/2005 | Daniels et al. | |
| 6,843,601 B2 | 1/2005 | Daniels et al. | |
| 6,877,899 B1 | 4/2005 | Cannon, Sr. | |
| 7,175,583 B2 | 2/2007 | Su | |
| 7,270,256 B2 | 9/2007 | Daniels | |
| 7,608,317 B2 * | 10/2009 | Keckeisen | B32B 27/08 |
| | | | 156/250 |
| 7,676,947 B2 * | 3/2010 | Borozny | B65C 9/262 |
| | | | 283/81 |
| 7,850,011 B2 | 12/2010 | Fisher et al. | |
| 7,850,014 B2 | 12/2010 | Nguyen et al. | |
| 8,012,076 B2 | 9/2011 | Selle et al. | |
| 8,067,072 B2 | 11/2011 | Tan | |
| 8,202,001 B1 | 6/2012 | Zhang | |
| 2003/0002752 A1 * | 1/2003 | Daniels | B65D 33/065 |
| | | | 383/8 |
| 2006/0045393 A1 * | 3/2006 | Daniels | B31B 19/36 |
| | | | 383/120 |
| 2008/0238083 A1 | 10/2008 | Warford | |
| 2009/0050505 A1 * | 2/2009 | Rubin | B42D 15/045 |
| | | | 206/459.5 |
| 2009/0295141 A1 | 12/2009 | Herbst et al. | |
| 2011/0049861 A1 | 3/2011 | Turner et al. | |
| 2014/0144806 A1 * | 5/2014 | Wilfong, Jr. | B65D 31/10 |
| | | | 206/554 |

OTHER PUBLICATIONS

The American Heritage Guide to Contemporary Usage and Style, 2005, Houghton Mifflin Company, p. 320.

Office action issued in corresponding U.S. Appl. No. 14/085,281 dated Mar. 13, 2019, 16 pages.

* cited by examiner

METHOD FOR APPLYING ADVERTISING MEDIA TO PACKAGING, METHOD OF ADVERTISING, AND SYSTEM FOR APPLYING A COMMUNICATION MEMBER ON A PACKAGING MATERIAL

FIELD

The technology described herein relates to packaging materials that have a communication member or other advertising media applied to a surface thereof. In particular, the technology described herein relates to packaging materials, such as T-shirt bags or cardboard boxes that have advertising media applied thereto. The technology described herein also concerns a method for manufacturing a packaging having a communication member applied thereto. The technology described herein also concerns a method of advertising using labels applied to media.

BACKGROUND

Annual usage of plastic bags by U.S. retailers is substantial, reaching billions of households. Many of these bags are of the t-shirt variety, with handles that project upwardly on each side from the mouth of the bag. Because a large number of plastic bags reach consumers, efforts have been made to provide advertising and coupons on bags.

Plastic bags and other types of packaging are often used for advertising. For example, grocery store retailers will print their name and logo on the front and/or back of each bag. Consumers often reuse bags and carry them back and forth to work, etc. As a result, retailers get free advertising while their bags are on display by the consumer. Thus, it is desirable by the retailer that their bags be unadulterated by coupons that block their logo and/or name.

U.S. Pat. No. 5,298,104 to Absher ("the '104 patent") teaches the application of a coupon assembly to a t-shirt bag and a paper bag. The coupon assembly 2 taught in the '104 patent concerns a Technicote Magic Film construction, as shown in FIGS. 1 and 2. The coupon assembly has a film portion 4 and a removable portion 6. The film portion is coupled to the removable portion by a fugitive adhesive 8. The film portion is secured to the bag by a permanent adhesive 10 and is not removable from the bag 12 so that it remains on the bag, even after the coupon is removed from the bag. The coupon assembly 2 in the '104 patent is shown positioned on a substrate 12, such as a bag. A paper layer 14 is positioned on top and has printing or ink I positioned on the top and bottom surfaces thereof. The bottom surface of the paper layer is coupled to a film layer 20 by a permanent adhesive 18. The bottom layer is a film 22 that is coupled to the bag by a permanent adhesive. A fugitive adhesive is positioned between the bottom of the paper layer (e.g., the film on the bottom of the paper layer) and the film that is positioned on the bag. When the paper layer 14 is removed along with the film 20, the fugitive adhesive 8 tears so that only the film and permanent adhesive remain on the bag, as shown in FIG. 2. The Technicote Magic Film label is positioned on a 40 lb. liner. Because of the type of label and liner, the Magic Film labels are not able to be fan-folded. Instead, they need to be positioned on rolls, as shown in the '104 patent.

In the recycling of plastic t-shirt bags, bags are typically ground and melted down. Typically the bags are washed of contaminants prior to recycling of the ground product. As a result, bags that have advertising media applied that is not the same material as the bag may not be recycled in the typical manner since contaminants are not permitted. For example, standard HDPE t-shirt bags that have paper coupons applied thereto would not be readily recyclable using standard means. Even where a plastic label and coupon combination is applied to an HDPE bag, a permanent plastic liner typically remains on the bag after the coupon is removed. In order to make the HDPE bag recyclable, not only would the paper coupon need to be removed, but the plastic liner would also need to be removed.

SUMMARY

In accordance with the teachings described herein, a packaging material having a communication member applied thereto and removable therefrom is described. In addition, a method of applying a communication member to a bag, box or other packaging material, as well as a method of advertising is described.

BRIEF DESCRIPTION OF THE DRAWING FIGURES

DETAILED DESCRIPTION

Figure 1:
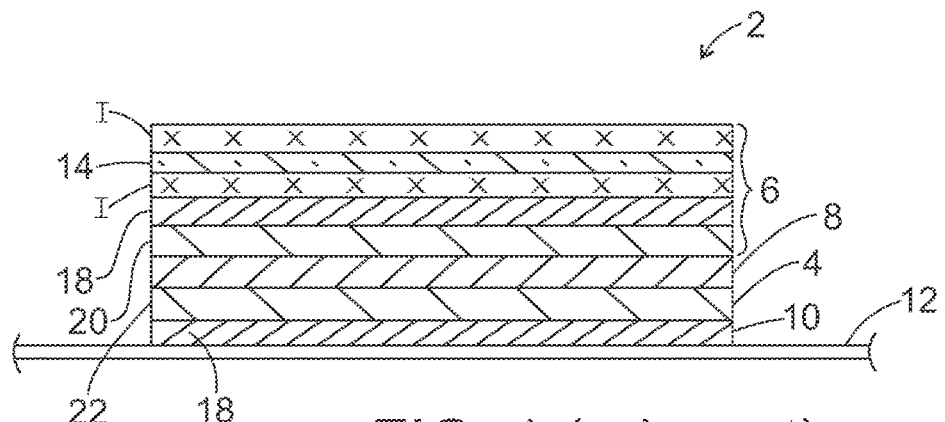
FIG. 1 is a cross-sectional view of a prior art label applied to a bag, as taught by the '104 patent.
Figure 2:
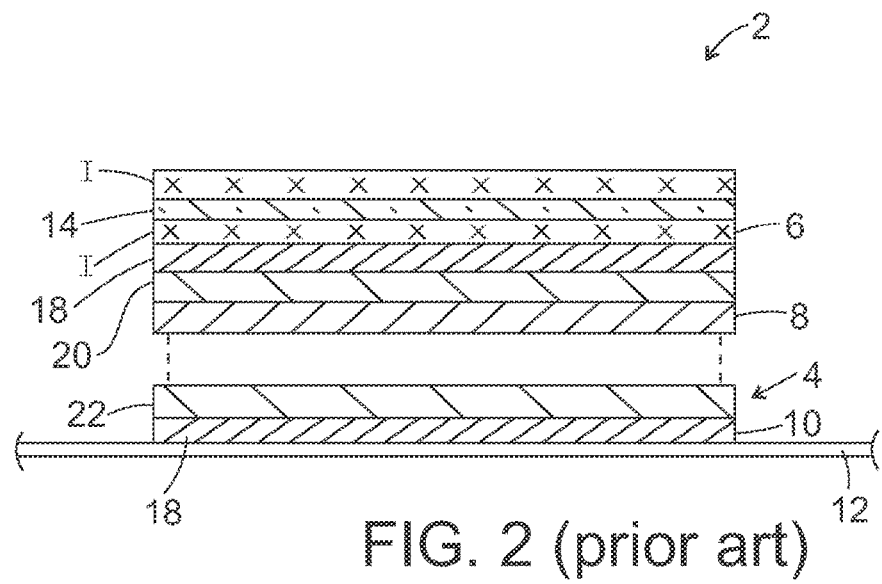
FIG. 2 is a cross-sectional view of a prior art label applied to a bag, as taught by the '104 patent.

The technology described herein relates generally to packaging materials that have a removable communication member or advertising material applied thereto. Examples of packaging materials include t-shirt bags and other paper and plastic bags, cardboard boxes, paper boxes, envelopes and many other types of packaging materials that are mass produced. The terms coupon and label are used throughout this application, but should be understood to mean any type of advertising media or product, or communication member, including labels, sample products, booklets, brochures, magnets, and the like, as known by those of skill in the art. Moreover, if the term "bag" is used herein in referring to a type of packaging material, it should be understood that the term "bag" can mean any type of packaging material, including bags, sacks, boxes, envelopes, or other packaging means known to those of skill in the art now or in the future. Other devices and packaging materials may also derive a benefit from the invention, as will be obvious to those of skill in the art.

Accordingly, an example bag 30 has a removable communication member, such as a coupon 32, applied to the bag 30. The coupon 32 is applied during the bag construction process and includes a removable backing A, such as an ultra-removable adhesive, a semi-permanent or a permanent backing, that permits the coupon 32 to be removed by a user without leaving substantially any residue, including any adhesive residue or a plastic liner, on the bag. Any type of adhesive A may be utilized. While a permanent adhesive may not be removable from certain substrates, given the nature of the bag surface, even when some types of permanent adhesives are used, the label 32 may still be removable due to the surface tension on the bag surface and due to the fact that the label portion 32 is stronger than the adhesive A. Thus, in addition to removable adhesives, permanent adhesives may be used. While any type of adhesive A may be used, the type of adhesive A should have generally stable properties. In some cases, bags 30 may be stored in boxes or in rolls for a period of time before being used. It is important that the adhesive A maintain its properties so that the coupons or labels 32 can be easily removed from the bag 30 even if some time has passed. The coupons 32 are removable so that the underlying advertising is fully visible when the coupon 32 is removed. This is also advantageous from a recycling perspective, since the bag 30 may be recyclable using standard means for recycling because there will not be any contaminants present.

When plastic bags 30 are recycled, they are typically ground, but not washed, so any remaining coupons or plastic liners that are not compatible with the type of material of the bag can spoil the mixture. The ground bags may tolerate up to 1% waste and still be processable into other products. However, the prior art designs that included a permanent plastic liner that remained on the bags were incompatible with the type of materials of the bags, with the bags being HDPE while the label liners were polypropylene. Thus, in one embodiment of the example label, no plastic liner is used. In another embodiment of the example label, an HDPE or otherwise recyclably compatible liner is used as part of the label so that it is fully recyclable with the bags.

The adhesive A should permit the label or coupon 32 to be removed from the bag 30. At the same time, the adhesive A should not be prone to predispensing during the dispensing process when the labels 32 are applied to a bag web. The air velocity of the web process and the speed of application need to be taken into consideration when selecting an adhesive A so that the label 32 can travel through the web handling systems of the label applicator and remain on the bag 30 during and after application.

A wash away adhesive A may be used in order to assist with the recycling process of the bags, if the bag material is to be washed before or after being ground. A wash away adhesive A can be used since it will not be detrimental to recyclability. The adhesive A may be washed with a cleaning or chemical solution, or simply with water, depending upon the application. Moreover, a patterned adhesive A may be used in order to reduce the amount of adhesive A that is applied to the bag 30, regardless of the type of adhesive A applied.

An example bag 30 has a removable coupon 32 applied to the bag 30. The coupon 32 may be a one part coupon, a multi-part coupon, a one-part label, a multi-part label, a multi-page communication member, an encapsulating packet, a scent packet, or a combination thereof. A multi-part coupon 32 may be one with a plastic layer and a paper or plastic coupon. The plastic layer may be made from HDPE so that it is fully recyclable with the bag 30. Alternatively, the plastic layer is removable from the bag surface. Other types of recyclable materials may be used, such as a film of BOPP or polyethylene blend MOD. The plastic layer can be applied with a permanent, semi-permanent, or removable adhesive A. Since the plastic material is the same material type as the bag 30, it doesn't matter whether the plastic layer is removed or not prior to recycling. The coupon 32 can be paper or plastic. Ideally, the paper coupon will be removed before recycling to avoid contamination of the recycling process. HDPE may be a clear or white film and is typically 2 to 2½ mill thick, but could be other thicknesses. HDPE has functionality to be die cut and can be printed upon effectively.

When a consumer uses the bag 30 after the coupon 32 has been removed, the advertising on the bag 30 is fully visible, which is advantageous to the advertiser. The bag 30 and process described herein provides a consumer with at least one coupon 32 on every bag 30, if desired. Alternatively, the process may provide coupons on some of the bags, but not all of the bags. The process could provide coupons on each bag 30, but with different coupons being applied in succession, such as a first coupon 32 on a first bag, a second coupon 32 on a second bag, a third coupon 32 on a third bag, and then repeating, with a first coupon 32 on the fourth bag, etc. The example process allows the advertiser to reach all consumers who use the bags, without too much redundancy. Thus, the bag and methods described herein provide an exceptional advertising tool for the advertiser and provide an important function for the consumer.

Figure 3:
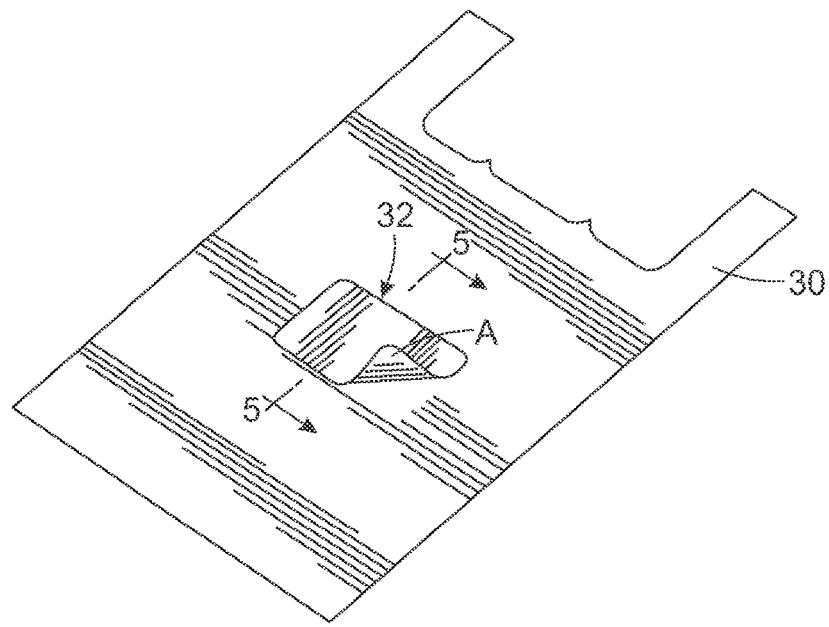
FIG. 3 is a perspective top view of an example bag having an advertising product or communication member applied thereto.
Figure 4:
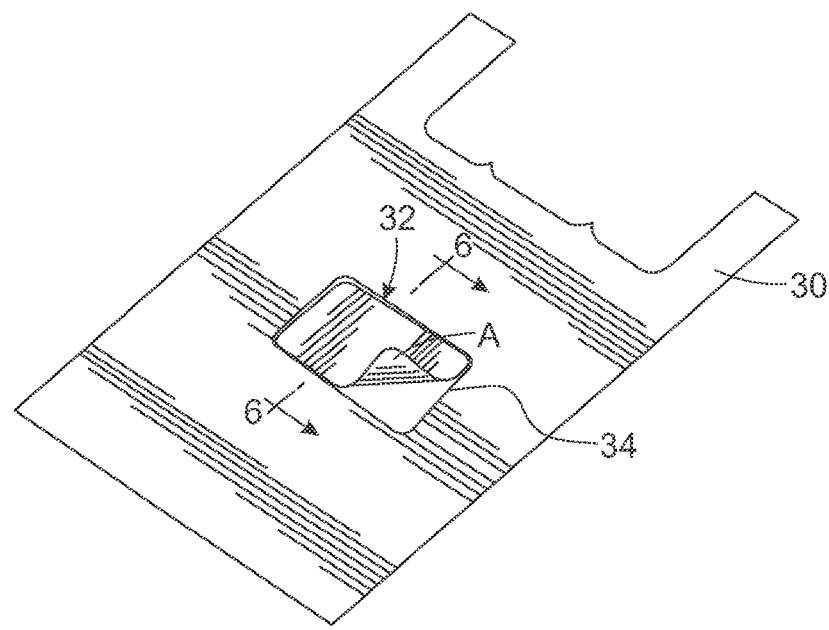
FIG. 4 is a perspective top view of an example bag having a different advertising product or communication member applied thereto.

Referring to the figures, FIG. 3 depicts an example bag 30 having a coupon 32 applied thereto with a removable adhesive A. The coupon 32 may include an ultra-removable adhesive A such that when the coupon 32 is removed from the bag 30, substantially no adhesive residue remains on the bag 30, as if the coupon 32 had not been present on the bag 30. In addition, the adhesive A that is utilized may be sticky or non-sticky. In the case of a non-sticky adhesive A, the coupon 32 may be readily usable as a coupon 32. In the case of a sticky residue, there may be instances where a sticky coupon is acceptable, or where a sticky coupon is preferred. In either instance, a film layer, whether clear or printed upon, is not necessary on the bag 30. The coupon 32 is removable without damaging the bag 30. In some cases, it is acceptable to leave some adhesive residue on the bag 30. In some instances, such as shown in FIG. 4, a film layer 34 may be utilized on the bag 30 and may be acceptable, particularly if the film layer 34 is the same type of material as the bag 30, as will be described in greater detail below. For example, in the case of an HDPE bag 30, the base liner 34 could also be an HDPE material, as shown in FIG. 4 hereof.

Figure 10:
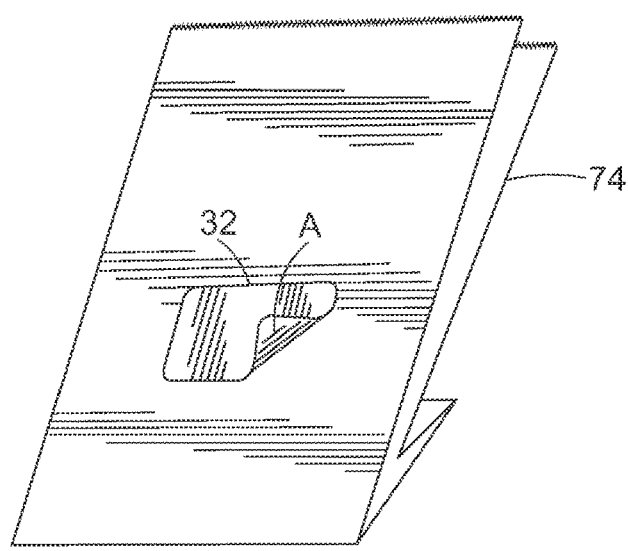
FIG. 10 is an alternative example bag having a removable advertising product applied thereto.
Figure 11:
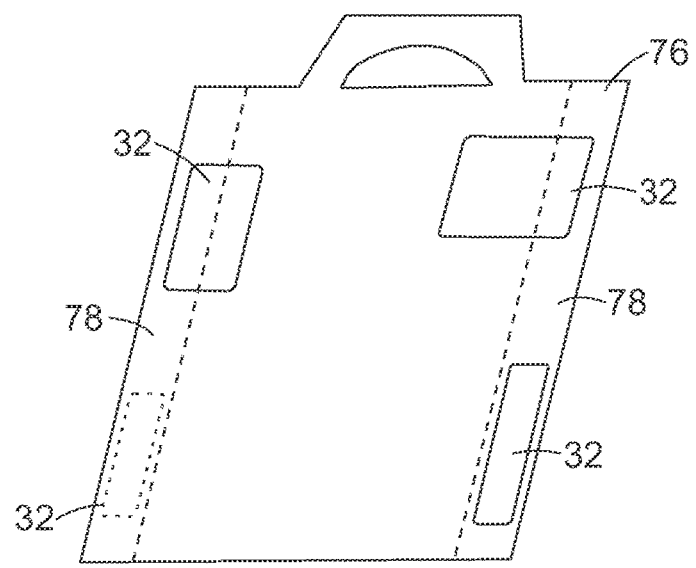
FIG. 11 is another alternative example bag having a removable advertising product applied thereto.

An example t-shirt bag 30 is shown in FIGS. 3 and 4 incorporating an example communication member 32. Other types of bags 30 may alternatively be utilized, such as paper bags or other types of plastic bags, among other bags (as shown in FIGS. 10-11). The coupon 32 could alternatively be applied to other packaging, such as envelopes or boxes (shown in FIG. 13), or other types of packaging, as desired.

The coupon 32 shown in FIGS. 3, 4, 5, 15, 18, 20, and 23 is a label 32 that includes a single sheet of material. The coupon 32 could alternatively be a multi-sheet booklet, as shown in FIG. 17, or a multi-layered coupon 32, such as shown in FIGS. 16, 19, 21, and 22, that can be peeled apart upon removal from the bag 30. A removable adhesive A, such as an ultra-removable adhesive A, may be coupled to the bottom surface of the coupon 32. This type of adhesive is typically low tack, but has strong peel strength and can be removed without marring the underlying surface. As discussed above, it is desirable to be able to remove the coupon 32 so that the underlying content is visible after removal. The adhesive A may alternatively be a semi-permanent or permanent adhesive, as long as it is removable from the bag material without damaging the bag 30. The coupon 32, when removed, may remain sticky, or may be substantially non-sticky.

In the alternative examples shown in FIGS. 16, 19, and 21-22, a base layer 34 may be utilized with the removable coupon 32. In this example, the base layer 34 may be clear and can be seen through such that if the layer is permanently adhered to the bag's surface, the consumer can read through the layer 34 such that any advertising material on the bag 30 remains visible. Alternatively, the base layer 34 can be made of paper or opaque. The base layer 34 is made of the same material as the bag 30 so that the bag 30 is recyclable.

Figure 5:
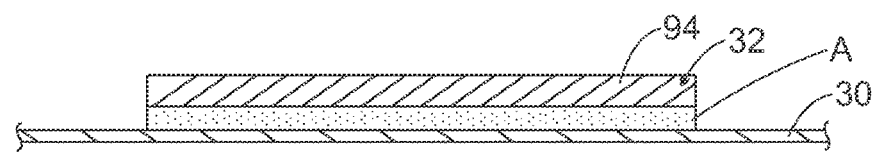
FIG. 5 is a cross-sectional view of an example bag and advertising product or communication member of FIG. 1 taken along line 5-5 in FIG. 3.

A cross-sectional view of the bag 30 and coupon 32 shown in FIG. 3, taken along line 5-5, is shown in FIG. 5. The label 32 shown is a one part label having a top layer 94 with a removable adhesive A, such as an ultra-removable adhesive, applied to the bottom surface of the top layer 94. A non-sticky adhesive A may be applied to the bottom surface of the top layer 94, or a sticky adhesive A may be applied. The adhesive A is of the type that when the top layer 94 is removed from the bag 30, substantially no adhesive will remain on the bag 30.

Figure 6:
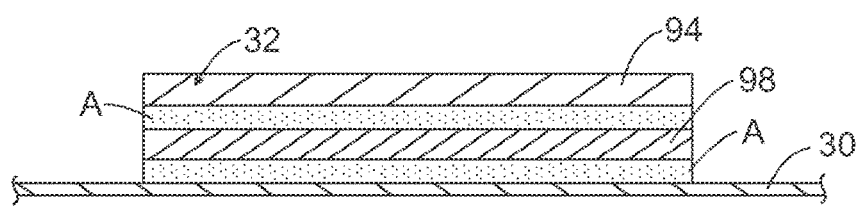
FIG. 6 is a cross-sectional view of an alternative example bag and advertising product similar to that shown in FIG. 1 taken along line 6-6 in FIG. 4.

An alternative cross-sectional view of the bag 30 and coupon 32 is shown in FIG. 6, which is taken along line 6-6 in FIG. 4. The coupon 32 may be a multi-part coupon 32 that includes a base layer 98 and a top layer 94. A first adhesive A, such as an ultra-removable adhesive, may be coupled to the bottom of the base layer 98 for coupling the base layer 98 to the bag 30. A second adhesive A may be used to couple the top layer 94 to the base layer 98. The second adhesive A may be of the type that does not feel sticky to the touch once the top layer 94 is removed from the base layer 98. Both the top and the base layer 94, 98 can be coupons 32 and can include advertising material, if desired. By providing a non-sticky surface between the base layer 98 and the top layer 94, the top layer 94 can be processed in a standard automated coupon processing machine. Alternatively, only the top layer 94 can be a coupon 32 and the base layer 98 can be thrown away.

In the case of the label 32 shown in FIG. 5, the user would remove the top layer 94 from the bag 30. The adhesive A would remain attached to the bottom surface of the top layer 94 and may be sticky or non-sticky.

In the case of the label 32 shown in FIG. 6, the user would remove the base layer 98 from the bag 30. The first adhesive A is attached to the bottom side of the base layer 98 and is removed with the base layer 98 so that the bag 30 is adhesive free. Then the top layer 94 is removed from the base layer 98. Any adhesive A may either remain with the base layer 98, be pulled off with the top layer 94, or part may remain on the base layer 98 and part may remain on the lower surface of the top layer 94. One type of non-sticky adhesive A that may be used is a fugitive, dry adhesive.

The coupons 32 are preferably applied to a packaging material or bag web using a label applicator. The labels 32 may be provided on a roll or as a stack of labels, such as fan-folded labels, and fed into the label applicator for application to the bag stock. The roll or stack of labels 32 may have a release liner 48 that is discarded when the labels 32 are applied to the bag stock. The adhesive A is pre-applied to the labels 32 on the roll or in the stack so that they may be adhered by application to the bag stock.

Figure 7:
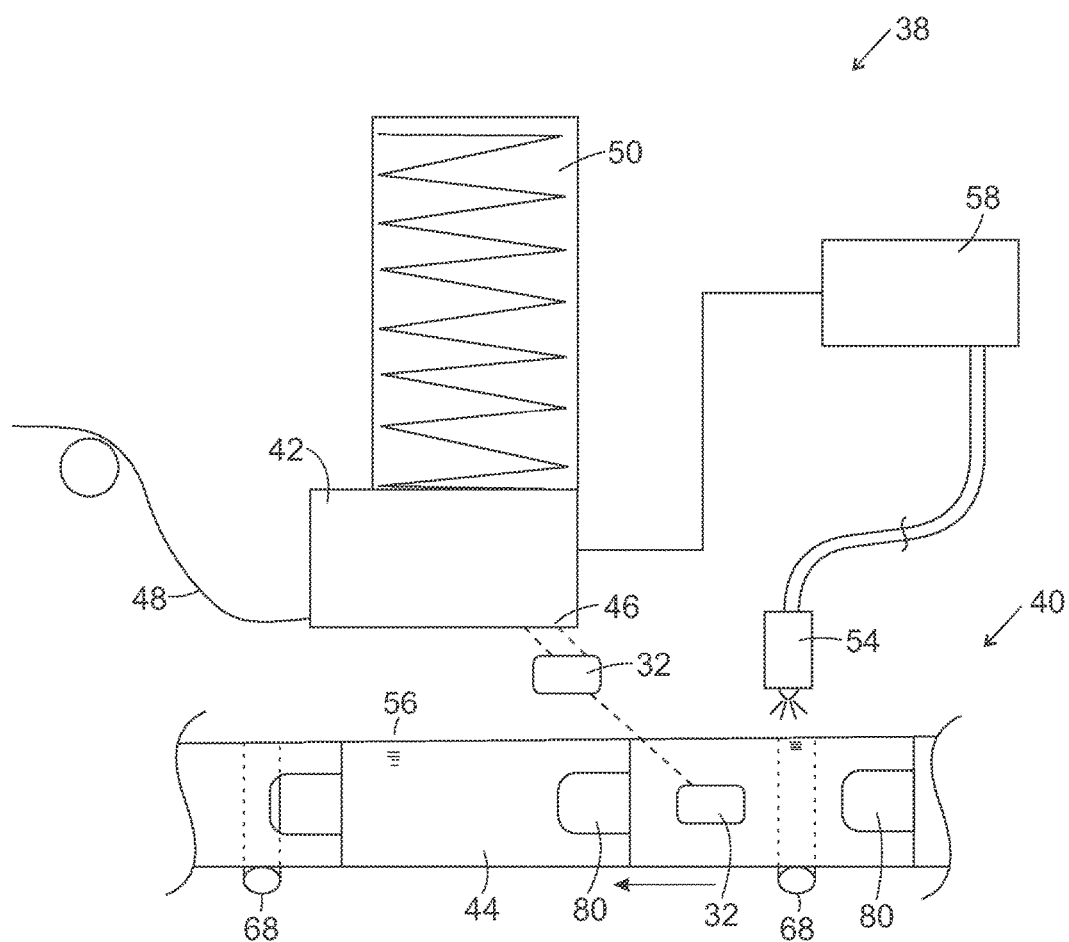
FIG. 7 is a schematic view of a label applicator system positioned adjacent a bag web according to the example method described herein.
Figure 8:
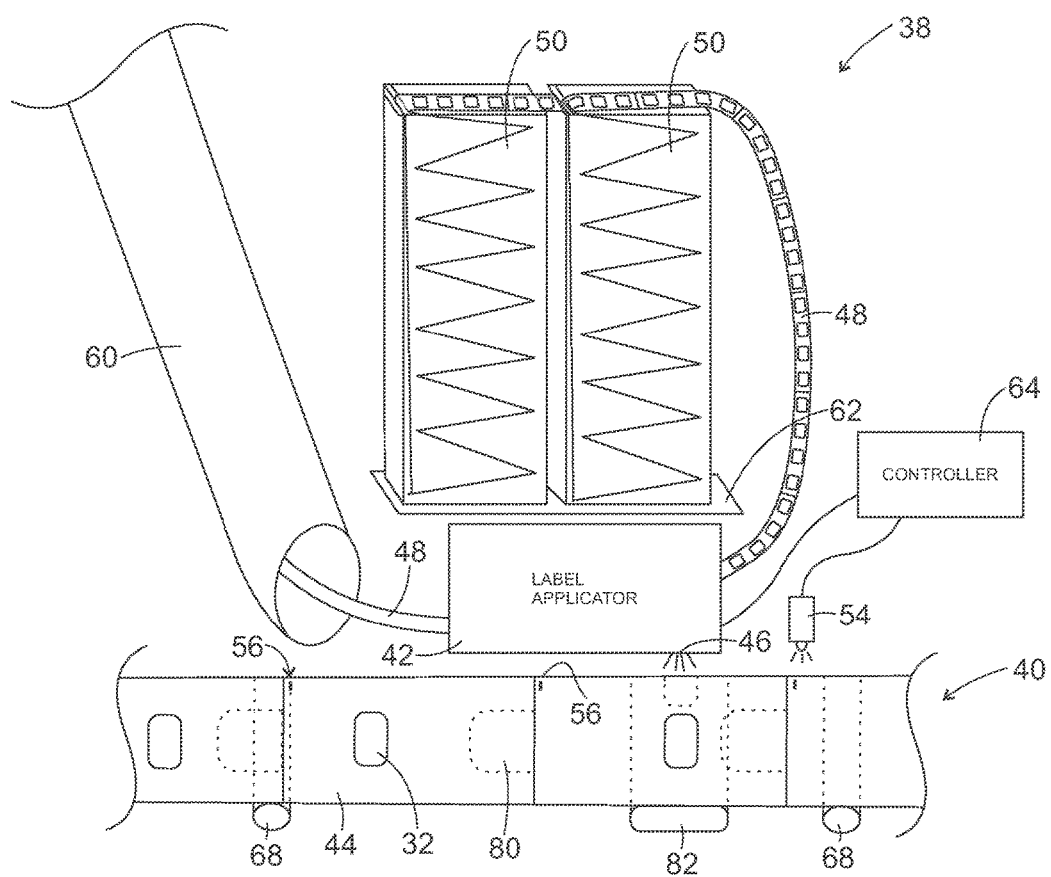
FIG. 8 is a schematic view of an alternative label applicator system positioned adjacent a bag web according to the example method described herein.
Figure 9:
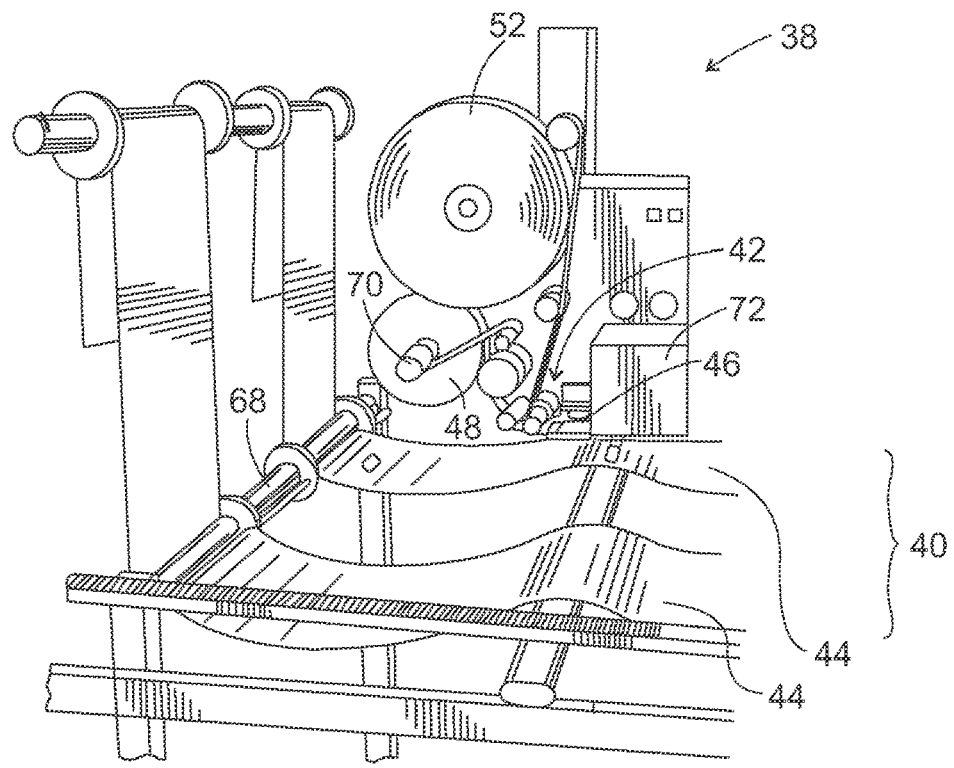
FIG. 9 is a perspective view of a portion of one type of bag making machine showing the cooperation between the bag making machine and the labeling machine, where the bag making machine and labeling machine may be used in the method described herein.

FIGS. 7-9 show an example bag manufacturing system 38 that includes a bag making machine 40 and process according to the invention. They also show a possible position where the labeling apparatus 42 could be positioned relative to the bag assembly line 44. FIG. 7 shows a single bag line 44 of T-shirt bags with a label applicator 42 positioned over the bag web 44. The label applicator 42 shoots or blows the labels 32 onto the bag web 44 as the web moves. The label applicator 42 may include a blow box 46 for this purpose. The label applicator 42 shoots the labels 32 on the web 44 with air pressure. Alternatively, the label applicator 42 can apply the labels 32 in any known manner. The labels 32 dispense from a release liner 48 at the desired time and then the release liner 48 is carried away and disposed of, such as being rolled up on a roll or otherwise disposed of. The labels 32 are positioned in a box 50 above the label applicator 42 in a fan-fold manner. Other types of labels 32 may be used, including those on rolls 52. Other positions for the label applicator 42 and/or label storage may be used.

The labels 32 may be applied while the bag web 44 is moving, or while the bag web 44 intermittently stops. In this regard, a sensor 54, such as a photo eye or other sensor, may be used to determine the location of the bag web 44. The sensor 54 may be tied to a registration mark 56 on the bag web 44. Alternatively, the sensor 54 could be tied to a gear or other mechanism in the process (not shown). The sensor 54 may be used to signal the bag making machine 40 to momentarily halt the feeding of the bag stock 44 in order to cut the bag stock 44 into individual bags 30. A drive motor is coupled to the label applicator in order to drive the system (not shown). A computer 58 is coupled to the system 38 in order to properly control the dispensation of labels 32.

FIG. 8 is similar to the system 38 shown in FIG. 7, but incorporates a dual box 50 label system that is positioned over the label applicator 42, as well as a vacuum system 60 to take away the liner 48 waste. The label applicator 42 is positioned over the bag web 44 and shoots or blows the labels 32 onto the bag web 44 as the web moves. There is limited space in a bag manufacturing line 40. Thus, the label applicator 42 is positioned in a space that is not currently being used and the label stock 50 is positioned above the bag line 44 in order to permit ease of changing out boxes 50 when the boxes become empty. Two boxes 50 are shown positioned on a platform 62 that is above the bag line 44. The boxes 50 are positioned inline so that the boxes form a narrow profile. These boxes 50 are approximately at waist height, but could be positioned at other positions. The boxes 50 are daisy chained together so that when one box empties, the labels 32 then automatically begin to be pulled from the second box. Once the first box 50 is emptied, the second box 50 can be moved into the position of the first box and the second box can be replaced. This way, the labels 32 can continuously be dispensed without having to stop the machine 40 to change out the boxes or rolls of labels 32. In addition, the boxes 50 simply seat on a platform 62 that is installed above the level of the label applicator 42 and no expensive changing equipment is needed.

The labels 32 dispense from a release liner 48 at the desired time and then the release liner 48 exits the label applicator 42 and is vacuumed into a vacuum system 60. The vacuum system 60 can transport the waste a distance away from the bag manufacturing line 40, such as across the building, 90 feet away, etc. Because of the limited amount of space in the vicinity of the bag manufacturing machine 40, this is advantageous because it allows the waste bin to be positioned at a spaced location from the bag manufacturing machine 40 so that it does not interfere with bag manufacture and so that it's easy to dispose of the waste. For example, the waste container can be positioned near a loading dock so that it can be easily emptied into a dumpster outside the facility. Other types of labels 32 may be used, including those on rolls 52, as discussed below in connection with FIG. 9. Other positions for the label applicator 42 and/or label storage may be used. A drive motor is coupled to the label applicator 42 in order to drive the system (not shown). A controller 64 is coupled to the system 38 in order to properly control the dispensation of labels 32 onto the bag web 44. The controller functions could also be incorporated into the controller for the bag manufacturing line 40, if desired, or be stand-alone.

FIG. 9 shows a bag manufacturing system 38 that incorporates two bag-making lines 44 that run side-by-side simultaneously. A labeling apparatus 42 is shown positioned over one of the webs 40. Alternatively, a labeling apparatus 42 could be coupled to each line 44 in order to apply a coupon 32 to each line of bag web 44. Other types of assembly lines may alternatively be used. For example, a single bag making process line may be used or a triple bag-making process line may be used, among others. The bag web 44 may be preprinted with advertising, logos, and the like, or the printing process may be included in the bag making process. The bag web 44 may be stamped and or cut at any point along the process, with the labeling apparatus 42 positioned such that it applies a label 32 at a prescribed time to the bag or the bag web 44, depending upon where the bag web 44 is in the manufacturing process.

FIG. 9 shows the cooperation between the bag making machine 40 and the labeling machine 42. A continuous web 66 of bag stock 44 is fed in a longitudinal direction via conventionally used rollers 68 to a region where the labels 32 are applied. The bag stock 44 may be paper, plastic, such as polyethylene, fabric, or a combination thereof, among other materials. The bag stock 44 may include preprinted advertisements on the face of the bag stock or may be printed during the manufacturing process. The bag making machine 40 may include an integral printing press, if desired, although not shown. The bag stock 44 is fed above a platen 82 and then through rollers 68 which are secured to a mounting plate.

The bag making machine 40 has an open region to allow positioning of the label applicator 42 so that the labeling machine 42 can directly be positioned adjacent the bag stock 44. One such location may be before the bag stock 44 is cut into individual bags 30, or before, during, or after printing. Another position is after the bag stock 44 is cut into bags 30. Yet another location is where the bag stock is cut into individual bags. Any type of bag making machine may be utilized. The example bag making machine 40 is used to manufacture t-shirt bags 30, but other bag making machines that make other types of bags may alternatively be used.

FIG. 9 shows the label applicator 42 with a roll 52 of label stock that is fed through and around various rollers 68 until the label 32 reaches the applicator 42. The label 32 may be blown onto the bag stock, rolled onto the bag stock, or otherwise positioned on the underlying bag stock 44. The label 32 is peeled from the liner 48 and the liner 48 then rolls up onto a liner reel 70. The label applicator 42 includes a drive motor 72 that is positioned adjacent the label applicator 42. If there are space constraints, the drive motor 72 could be positioned at a different location. A controller 64 may also be used to control the application of labels 32 to the bag web 44. The roll 52 of labels 32 will eventually run out and then a new roll 52 will have to be inserted on the reel. A roll transporting mechanism can be used for this purpose. It may be necessary to stop the bag manufacturing line 40 to change out the roll 52. In addition, the liner waste roll 70 will eventually become full and need to be emptied. It may be possible to empty the liner waste roll 70 at the same time as the roll of label stock. Alternatively, the liner waste roll 70 could be emptied at a different time. Other types of packaging materials may be utilized, in which case different mechanisms may be used to manufacture the packaging material or to apply the labels 32 to the packaging materials.

In examples such as those shown in FIGS. 7 and 8, stacks of labels 50 may be positioned in boxes or trays in the production line and a sensor (not shown) can be utilized to signal that the labels 32 are running low. A sensor could be mounted on the label applicator 42 or elsewhere in order to sense when the labels 32 are running out. Light signals or other signals could be utilized to signal when a first box or tray runs out of labels 32 and a second tray is being utilized so as to signal to the operator that it's time to add labels 32. For example, a window can be created in the box that holds the stack of labels 32 and a sensor can be mounted on the machine that senses when the supply in a box is getting low. Labels 32 could be fed from the side of the bag making assembly 40 instead of being positioned over the assembly. With this embodiment, hardware would be used to turn the labels 32 so that they are properly positioned relative to the label applicator 42. Web tension of the label web would need to be controlled if the label web is positioned at a distance from the label applicator 42.

When rolls of labels 52 are used instead of fan-folded labels, an inline automatic roll changer may be utilized in order to ensure a continuous supply of labels 32. An offline dual roll system may alternatively be used.

Labels 32 may be applied while the web 44 is moving or while the web 44 is stationary. Webs 44 may travel at speeds of about 300 cycles per minute or more. The examples provided herein may alternatively be utilized on an off-line system, where the bags are not formed in a web, such as paper bags. In this system, the labels 32 could be applied after the bags are formed. Alternatively, the labels 32 could be applied to the paper bag web and positioned on rolls of material that are later made into bags.

FIG. 10 depicts an example label 32 applied to a paper bag 74 and FIG. 11 depicts a plurality of labels applied to another type of die cut handle bag 76. The paper bag 74 has a label 32 applied in a center section of the bag on a top surface thereof. Alternatively, the label 32 could be applied in the vicinity of the gussets 78, on the sides of the bag in the area of the gussets 78, or on the bottom surface of the bag, some examples of which are shown in FIG. 11. In the case where the label 32 is applied within the gusset area 78, the label 32 may need to be applied before the gussets 78 are folded. Multiple coupons 32 may be applied to a single bag, if desired.

Figure 12:
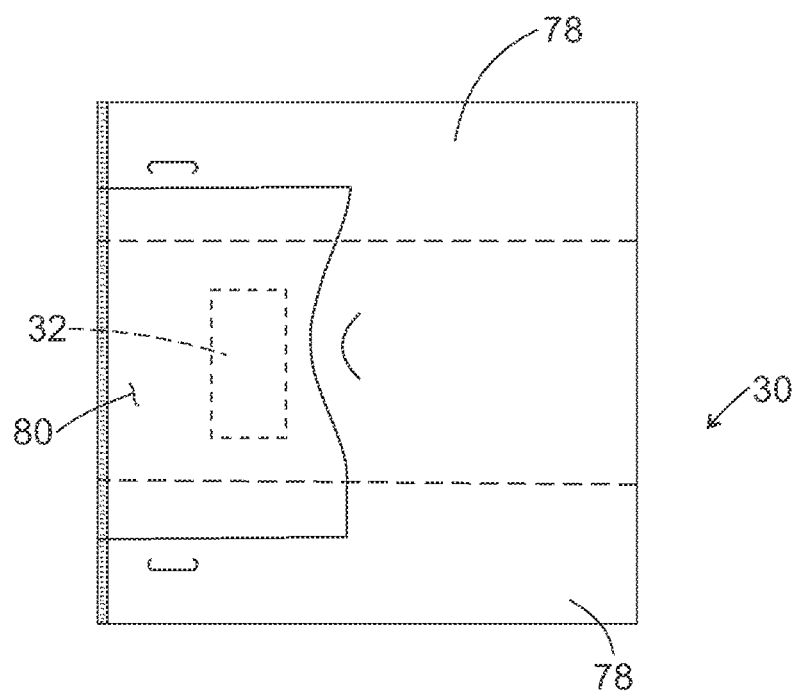
FIG. 12 is an example bag incorporating a label that is positioned between the gussets and inside the handle cut out.

FIG. 12 depicts a possible position for the label 32 which is positioned between the gussets 78 (so in the center of the bag 30) and within the handle cut out area 80 when the bag 30 is folded in half.

An example bag making machine 40 that may be utilized with the method is depicted. Other types of bag making machines may alternatively be utilized. The bag making machines 40 of FIGS. 7-9 are provided for illustration purposes.

Any type of label applicator 42 may be used, such as a label applicator 42 that feeds labels 32 from a reel 52 or from a fan-fold supply of labels 40. Multiple reels may be utilized in series in order to allow for continuous operation when a reel runs out of labels. Alternatively, accordion, or fan-folded pleated labels positioned in trays or boxes 50 may be utilized instead of a reel 52. Any type of labels 32 may be used as long as they can be used in large quantities and can be effectively introduced to the labeling machine 42 in any known way. The release liner 48 should have sufficient strength to withstand the application process and to permit disposal of the release liner 48.

As shown in FIG. 9, a platen 82 may be positioned directly under where the coupon 32 is blown in order to provide a rigid surface against which the coupon 32 is applied. The platen 82 may be made of metal or other rigid material. The platen 82 may facilitate application of the coupon 32 to the bag stock. A platen or other bar of material may be positioned under the bag stock at other points in order to help to bring the bag stock into position for label application and to stabilize the bag stock 44 and hold the web.

As previously discussed and as schematically depicted in FIGS. 7-8, a sensor 54, such as a photo eye, may be used to register with a mark on the bag stock in order to trigger application of the label 32. The photo eye 54 may be linked to a computer 58 that is associated with the bag making machine 40. The photo eye 54 can be used for feeding of the bag stock 44 and/or for sensing gaps and can signal to the label applicator 42 when to apply or when to stop applying labels 32. The sensor 54 may be activated when the bag stock is in a stationary position, such as when the bag stock 44 is being cut into an individual bag 30. Any type of known sensor may be utilized for this purpose. If a sensor is not used, then the label application can be tied to the cutting operation, such that as the cutting occurs, the label applicator 42 applies the coupon 32 substantially simultaneously. The sensor could be used to trigger based upon the movement of the cutter, rather than the movement of the bag stock, or based upon some other parameter, if desired.

Label application can be tied to printing of the bag stock or cutting of the bag stock during the manufacturing process. It can be tied to a firing mark 56 on the bag stock using a programmable controller print register, which is a visual camera that sees the bag stock. Label application could alternatively be tied to a repeat of the machine. Label application may be continuous or intermittent. Label application can be tied to the electronics of the bag manufacturing equipment, or to separate equipment that senses the bag stock and is tied to the label applicator 42. The label 32 can be applied before or after printing of the bag stock, or before the bag web 44 is cut into bags 30. Label application may occur while the web 44 is flat.

The coupon assembly 32 may be applied at a stage in the bag production after which the bag stock is no longer wound through the turns of the bag making machine 40 in order to deter coupons 32 from falling off the bags 30 during the production process. However, it is possible to apply the coupons 32 to the bag stock 44 at areas where turns occur as long as the adhesive A is strong enough to withstand pulling off of the coupons 32.

A method of applying a coupon 32 to a bag 30 includes feeding a continuous web of bag stock 44 in a first direction, feeding a labeling stock 50, 52 to the bag stock 44, applying a label 32 to the bag stock, and cutting the bag stock to form a bag 30. The label 32 may be applied before, after or during formation of the shape of the bag 30. During the cutting step, the bag stock 44 may be temporarily stationary and the coupon 32 may be applied while the bag 32 is temporarily stationary. Alternatively, the coupon 32 can be applied on the fly while the bag stock 44 is moving, as known by those of skill in the art.

While individual labels 32 are shown being applied, a larger strip of labels (not shown) could be applied to a greater surface area of the bag 30, if desired. The entire strip could be removable. Alternatively, the adhesive A could be patterned on the bottom of the label 32, and the label 32 could be perforated 88, such that only a portion of the label 32 is removable from the bag 30 and a portion remains on the bag 30, for example. In addition, the labels 32 could include a product sample, if desired, so that the product sample is trapped within the coupon 32. When the coupon 32 is removed, the trapped product sample can be released. Alternatively, the product sample can be positioned and sealed between an outer and an inner layer (not shown), such as a small bag or pouch. In this case, the pouch can be removed and then opened in order to release the sample product.

After being manufactured, bags 30 may be stored either in boxes or on rolls. When stored in boxes, they may be stacked. When stored in rolls, they are die cut. The examples described herein may be utilized with either type of bag 30. Bags 30 will typically have gussets 78. When the example labels 32 are applied to the bag 30 in the central, non-gusseted area, they do not result in any additional room being taken up in a box full of bags or on a roll since the gussets 78 will have a greater overall thickness than the labels 32. Thicker labels 32 may be used because of this additional space, if desired.

Figure 13:
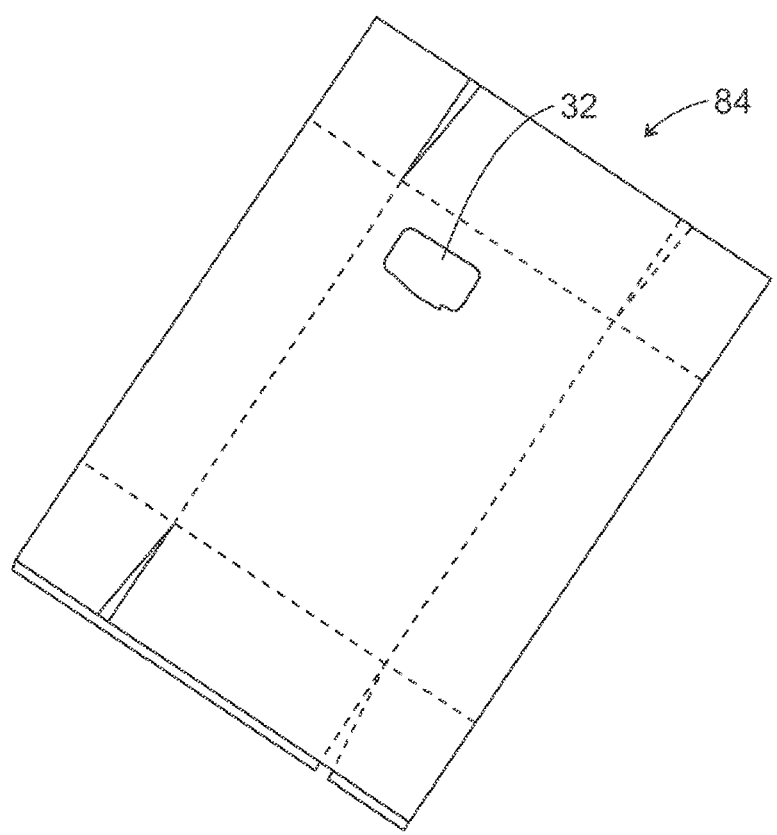
FIG. 13 depicts the label of FIG. 14 applied to a cardboard box blank.

FIG. 13 depicts a box blank 84 having a label 32 applied thereto. As discussed above, different types of packaging materials may utilize the examples described herein.

Figure 14:
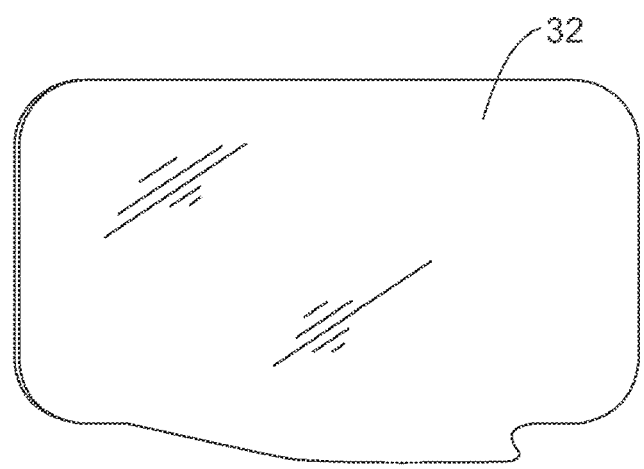
FIG. 14 depicts an example label that may be applied to a bag or other packaging materials.

FIG. 14 depicts an example communication member 32, such as a label 32, having a specific shape of a speech bubble. The label 32 may be applied to a release liner 48 and cut into the desired shape, including any advertising media desirable. Any type of material may be used for the label 32, including paper or polymeric labels 32, such as HDPE, LDPE, polyester, or the like. Other shapes of labels 32 may be utilized.

Figure 15:
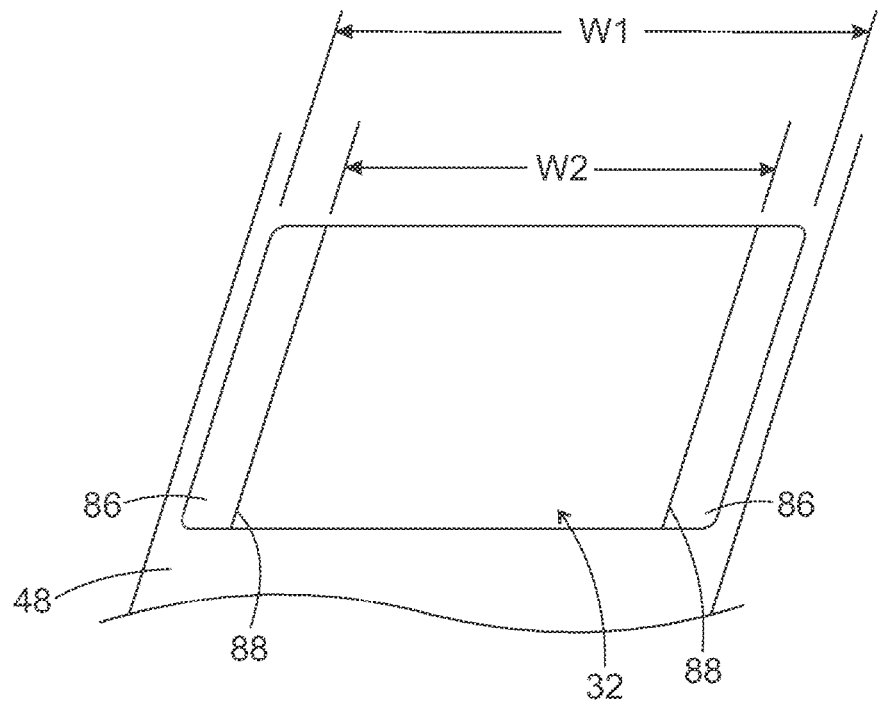
FIG. 15 depicts a perspective view of a label positioned on a liner for use with the example bag, with the label having removable wings.

FIG. 15 depicts a type of label 32 that can be applied to a bag 30, such as a label 32 that has wings 86. In the example shown, the label 32 is positioned on a liner 48. A die line defines the outer edges of the label 32. The label 32 has an approximately 3 inch inner section and a total width of about 4 inches. The label 32 includes a top polymeric layer that includes the wings 86. The top polymeric material may be an HDPE material that can remain on the bag 30 if the center section of the label 32 is removed. Alternatively, the top polymeric material can be removed with the inner section of the label 32 so that no adhesive residue remains on the bag 30. The label 32 may include perforations 88 between the wings 86 and the inner section of the label 32 in order to allow for easy removal of the label 32 from the wings 86. The wings 86 may include patterned permanent adhesive A, or a solid removable adhesive layer, among other types of adhesive A. Because the wings 86 have a small area, they may remain on the bag 30, even if they are made of a different material from the bag 30, and be recycled with the bag 30 since they will result in fewer than 1% waste and will not destroy the mixture.

Figure 16:
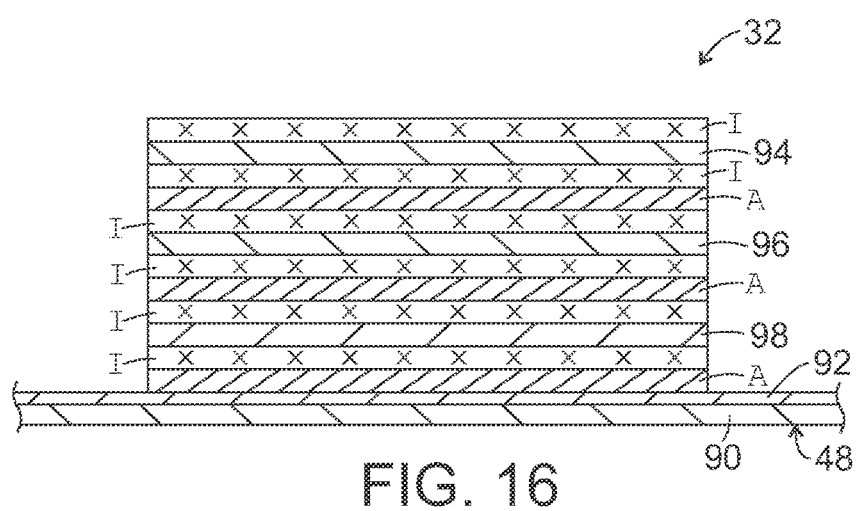
FIG. 16 depicts a cross-sectional view of an example label applied to a liner.
Figure 17:
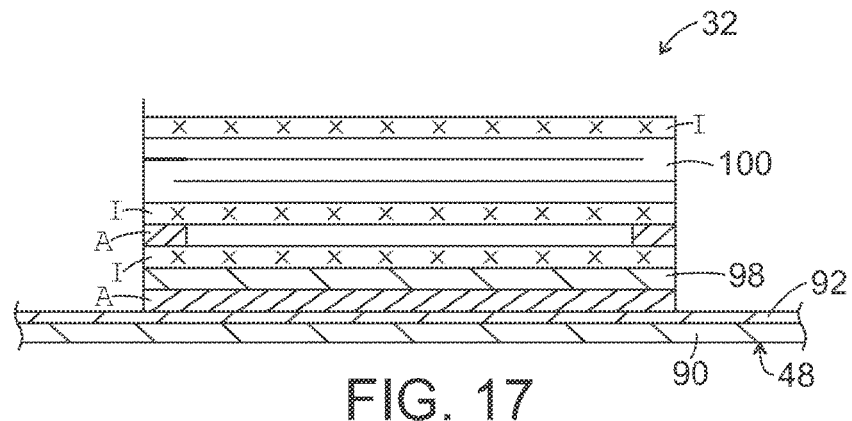
FIG. 17 depicts a cross-sectional view of another example label applied to a liner.

FIG. 16 depicts an example of a multi-part label 32 positioned on a release liner 48 that has a base paper layer 90 and a silicone coating layer 92. The multi-part label 32 includes an upper layer of paper or film 94 that has ink I positioned on an upper and lower side of the paper or film layer 94. A second paper or film layer 96 is sandwiched in the middle of the label 32. The second paper or film layer 96 has ink I positioned on either side of the second paper or film 96. An adhesive A is positioned between the top paper or film 94 and the second paper or film layer 96. A third layer 98 of the multi-part layer is a plastic layer. The plastic layer 98 has ink I applied to its top and bottom surfaces. Then adhesive A is positioned between the second paper or film layer 96 and the plastic layer 98. An adhesive A is then positioned between the plastic layer 98 and the silicone coating 92 of the release liner 48. The plastic layer 98 may be made of the same material as the bag 30 in order to promote recyclability in the event that the liner remains on the bag 30. The layer 98 may be transparent.

FIG. 17 depicts an example two part label 32 that has a base layer 98 that can either remain on the bag 30 or be removed from the bag 30 by the consumer. In this example, the base layer 98 is made of the same material as the bag 30 in order to promote recyclability in the event that the base layer 98 is not removed from the bag 30. The base layer 98 may be transparent or opaque. This example includes a booklet 100, which is the top layer of the two-part label 32. Ink I is applied to the booklet 100 on both the top and bottom thereof. Ink I is also applied to a top surface of the base layer 98 so that the base layer 98 includes advertising material as well as the booklet 100. Adhesive A is provided between the bottom of the booklet 100 and the top of the base layer 98, as well as between the bottom of the base layer 98 and the top of the silicone coating 92 of the release liner 48.

Figure 18:
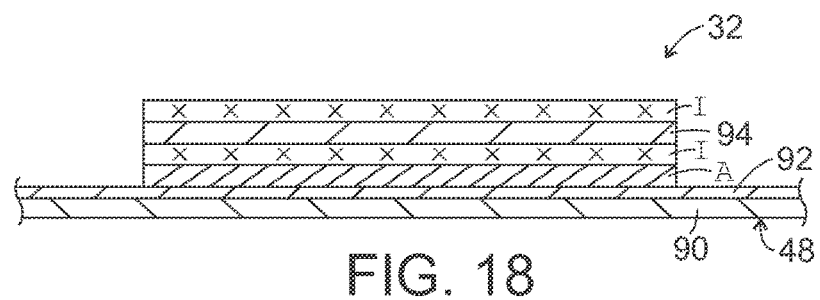
FIG. 18 depicts a cross-sectional view of yet another example label applied to a liner.

FIG. 18 depicts an example single layer label 32 in cross-section. As with the prior examples, the liner 48 is removed during the application process and disposed of. In this example, a paper or plastic label 94 has printing or ink I applied to its top and bottom surfaces. Then an adhesive A is positioned between the bottom of the label 94 and the silicone release liner 48.

Figure 19:
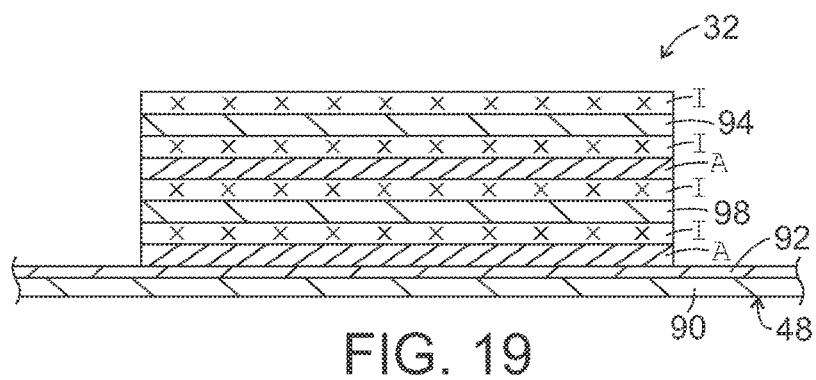
FIG. 19 depicts a cross-sectional view of a further example label applied to a liner.

FIG. 19 depicts an example two-part label 32 that includes two paper or plastic layers. The top paper or plastic layer 94 has ink I printed on both the top and bottom of the label 32. The bottom paper or plastic layer 98 also has ink I printed on both the top and bottom of the label 32. Adhesive A is positioned between the top and bottom paper or plastic layers 94, 98. In addition, adhesive A is positioned between the bottom layer 98 and the release liner 48.

Figure 20:
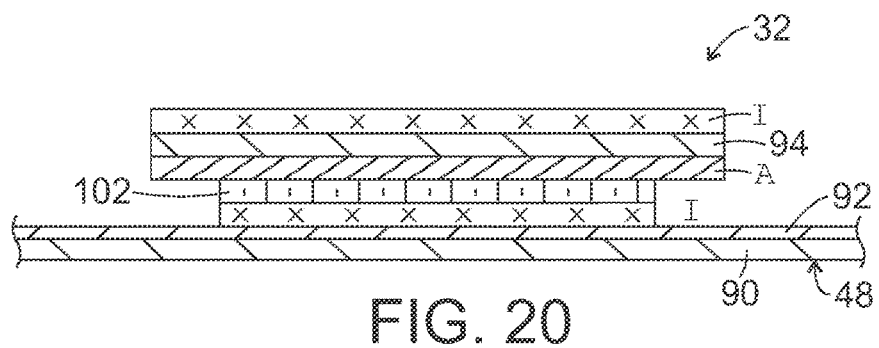
FIG. 20 depicts a cross-sectional view of another example label applied to a liner.

FIG. 20 depicts an example single layer label 32 that includes a paper or film layer 94 that has ink I applied to an upper surface of the paper or film layer 94 and an adhesive A applied to a bottom surface of the paper or film layer 94. A deadening coating 102 is applied to the adhesive layer A so that most of the adhesive A is deadened except for an outer portion of the adhesive A. Ink I or printing is applied to the deadened coating 102. The adhesive A that remains around the outer edge of the paper or film layer 94 holds the label 32 on the release liner 48 and ultimately on the packaging material.

Figure 21:
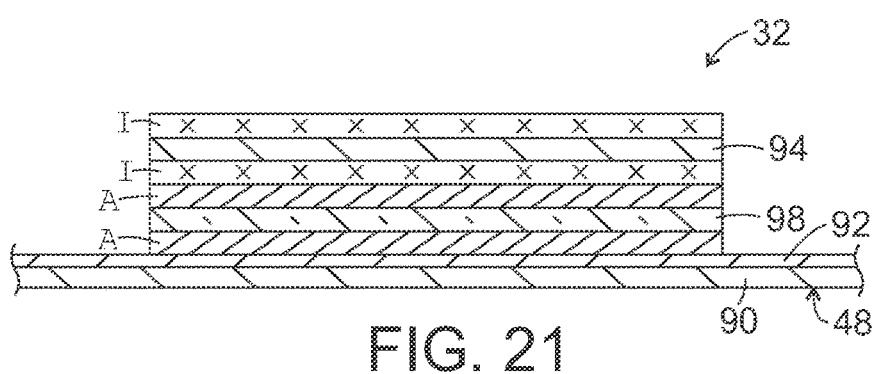
FIG. 21 depicts a cross-sectional view of another example label applied to a liner.

FIG. 21 depicts an example two-part label 32 that has an upper paper layer 94 and a lower clear plastic layer 98. The upper paper portion 94 has printing I on the top and bottom surfaces thereof and can serve as a coupon 32 for redemption by the user. The lower clear plastic layer 98 may remain on the packaging or may be removed by a user. The plastic layer 98 may be made of a compatible material to the packaging material in order to promote recyclability. An adhesive A is applied between the top surface of the plastic layer 98 and the bottom surface of the top paper layer 94, as well as between the bottom surface of the plastic layer 98 and the top of the release liner 48.

Figure 22:
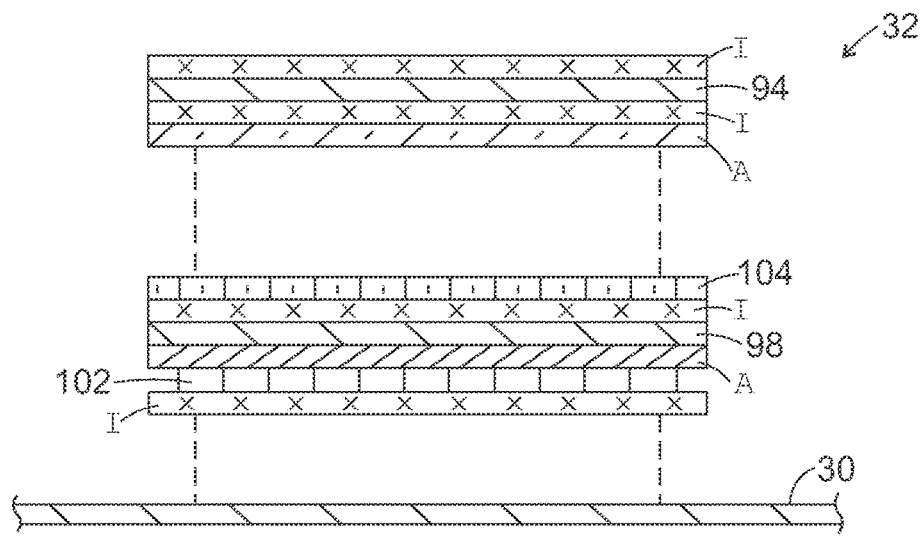
FIG. 22 depicts a cross-sectional view of another example label applied to a liner.

FIG. 22 shows an expanded multi-part layer after the label parts have been separated from the underlying substrate, which, in this case represents a bag surface 30. The example shown includes an upper removable label 94 that includes a paper or plastic layer with printing or ink I positioned on a top and bottom surface of the paper or plastic layer 94. A second layer 98 is positioned below the top layer and includes a base paper layer that is coated on the upper surface with ink I, which is covered by a release coating 104, which is covered by a dry adhesive A. The release coating 104 may be a UV release coating that allows the adhesive A to bond to it for later release and also protects the printing. The bottom surface of the second layer 98 includes an adhesive A that is coated in part by a deadener 102 in order to deaden the adhesive A except for in an area around the perimeter of the label 32. Then ink I is applied to the deadener 102 and the adhesive A. The adhesive A around the perimeter of the label 32 is applied to the bag layer 30 to hold the first and second layers on the bag 30. In this example, patterned adhesive A could be used instead of deadened adhesive, if desired.

Figure 23:
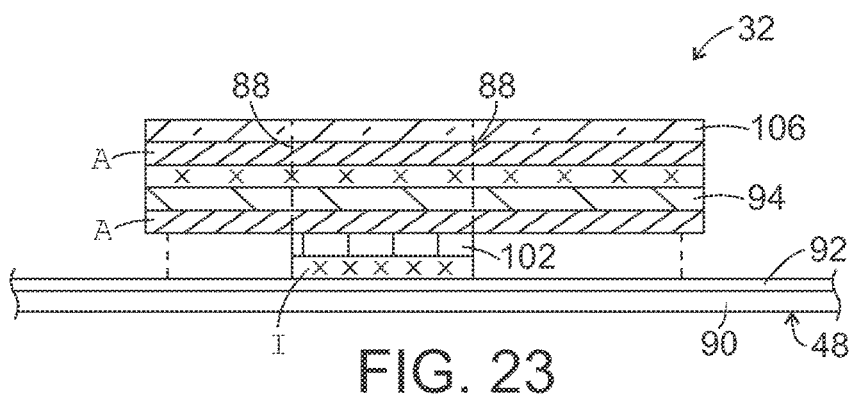
FIG. 23 depicts an expanded cross-sectional view of yet another example label applied to a liner.

FIG. 23 depicts a single part label 32 that has a perforated center portion that can be removed from the remainder of the label 32. The label 32 is shown positioned on a liner 48 having a silicone coating 92. The label 32 includes a paper layer 94 that is coated on top with an adhesive A. Then a clear plastic film 106 is coupled to the adhesive A and forms the top layer of the coupon 32. Printing I is also provided between the adhesive A and the film layer. An adhesive A is coupled to the bottom surface of the paper label 94. Part of the adhesive A on the bottom of the paper layer 94 is coated with a deadening coating 102, and ink I is then positioned over the deadened coating 102. Perforations 88 are provided through the label 32 so that the deadened portion 102 of the coupon 32 can be removed and redeemed.

Figure 24:
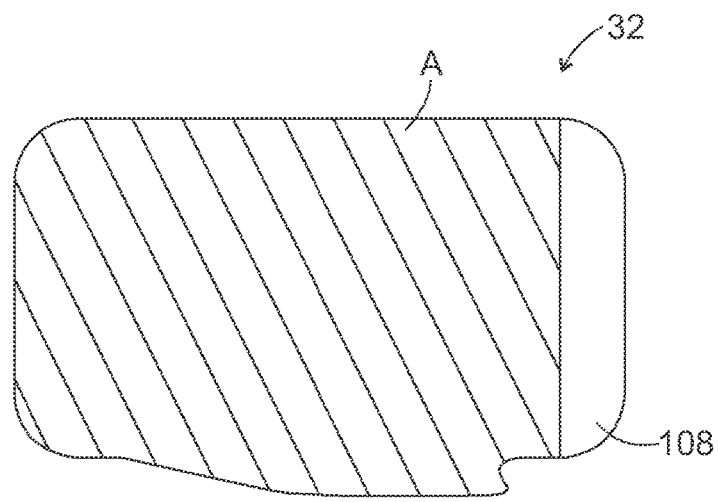
FIG. 24 depicts a plan view of an adhesive applied to an example label.
Figure 25:
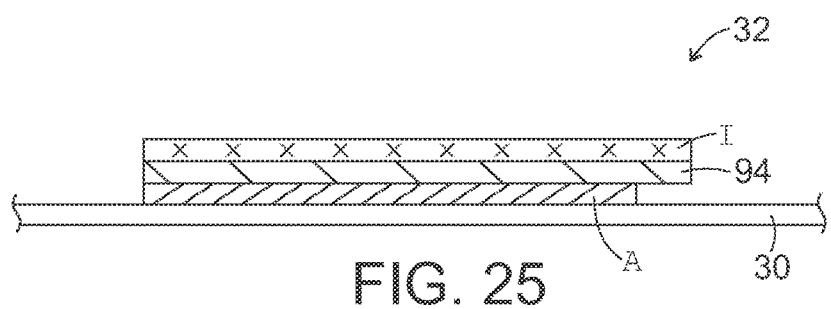
FIG. 25 depicts a cross-sectional view of the label of FIG. 24.

FIG. 24 depicts the bottom of a label 32 that has a patterned adhesive A coating on only part of the bottom of the label 94. One outer edge 108 of the label 32 is left uncoated so that it is easy to lift up in order to remove the label 32 from an underlying substrate. FIG. 25 depicts the example coupon 32 of FIG. 24 in cross-section, showing how adhesive A is only positioned on part of the bottom of the label 94, and not the entire bottom of the label 94. Patterned adhesives A may be used with the labels 32 described above. Patterned adhesives may involve adhesives that are formed in patterns, or that are only positioned in certain locations on the label 32. Examples of adhesive patterns include crisscross, dots, outer area, and the like. Silicone coated liners are discussed herein. Other types of liners 48 may alternatively be used, including those presently known or developed in the future. Scented coatings may be incorporated into the labels 32, if desired.

In all of the prior examples, the printing or ink I may alternatively be applied on top of the adhesive A. The adhesive A may be a removable or ultra-removable adhesive, a dry adhesive, a water-based adhesive, or a permanent adhesive, depending upon the particular application. The labels 32 may be formed by die cutting or by guillotine cut, depending on the material types. Any known type of labels 32 may be utilized. Other steps may be used in the manufacturing process for the label 32, as known by those of skill in the art, to optimize the label 32.

If desired, the production process can be set up so that different coupons 32 may be sequentially applied to different bags 30 being formed in the same manufacturing line to prevent flooding the market with a single coupon 32. For example, the coupons 32 being applied could be alternated in a pattern such that different coupons are applied from the same reel or box of label stock. Alternatively, different label applicators 42 could be aligned with a single bag making line 40 and could fire in succession rather than simultaneously to provide different labels 32 on the bags 30. Thus, the labels 32 may be provided with alternating graphics, the same graphics, with different labels 32 in succession, or applied in other known ways.

There are different types of buying scenarios that the bags 30 may be utilized in. In one scenario, the consumer may receive a single bag 30. In other scenarios, the consumer may receive multiple bags 30. In the grocery store, there are full service lines that are typically designed for larger order, and express lines that are designed for smaller orders. The bags 30 and labels 32 may be customized based upon the type of application. Where a single bag 30 is typically utilized, each bag 30 can have the same coupon 32 since the likelihood of repeat is minimal. In the context of express lines at a grocery store, every other bag 30 could have a different coupon 32, or every three bags 30 could have a different coupon 32. Alternatively, every second or third bag 30 could have no coupon 32. In the context of full service grocery store lines, coupons could be provided on every third or fourth bag 30, or different coupons could be on every three or four bags 30, so that bag 1 would have a first coupon 32, bag 2 could have a second coupon 32, bag 3 could have a third coupon 32, bag 4 could have a fourth coupon 32, bag 5 could have the first coupon 32, bag 6 could have the second coupon 32, etc. In this manner, the consumer is not flooded with the same coupons on each of the bags, which provides additional advertising opportunities for the seller, as well as an advertising method that allows the consumer to get multiple targeted coupons on their grocery bags 30, with the targeting being dependent upon the type of shopping experience. In the case where some of the bags do not have labels 32, the label application would be intermittent during the manufacturing process for the bags.

There are multiple applications for coupons on bags 30 within stores. In a grocery store, there are produce bags, bakery bags, meat bags, and the like. Each of these bags 30 could include a label 32. Coupons positioned on such in-store bags 30 could include offers that may be taken advantage of by the consumer during that shopping experience and can encourage consumers to purchase things in the store. Examples may be meal solutions, menus, and the like. Bakery bags could provide offers for coffee, for example.

Bags 30 in one particular type of store can be used to attract people to a different type of store. For example, a bakery may include a bag 30 with a coffee coupon for the coffee shop next door. There are many different possible applications of the example advertising method, as will be readily recognized by those of skill in the art.

While boxes and bags 30 are shown by way of example as possible items of packaging materials, other items may also utilize the present method and label 32, including cups, such as cups having coupons applied to the sides thereof, returnable cartons or containers, food containers, other types of boxes, clamshells, or any other type of product that can be positioned in an assembly line while allowing a labeler 42 to apply a label 32 to the product.

Figure 26:
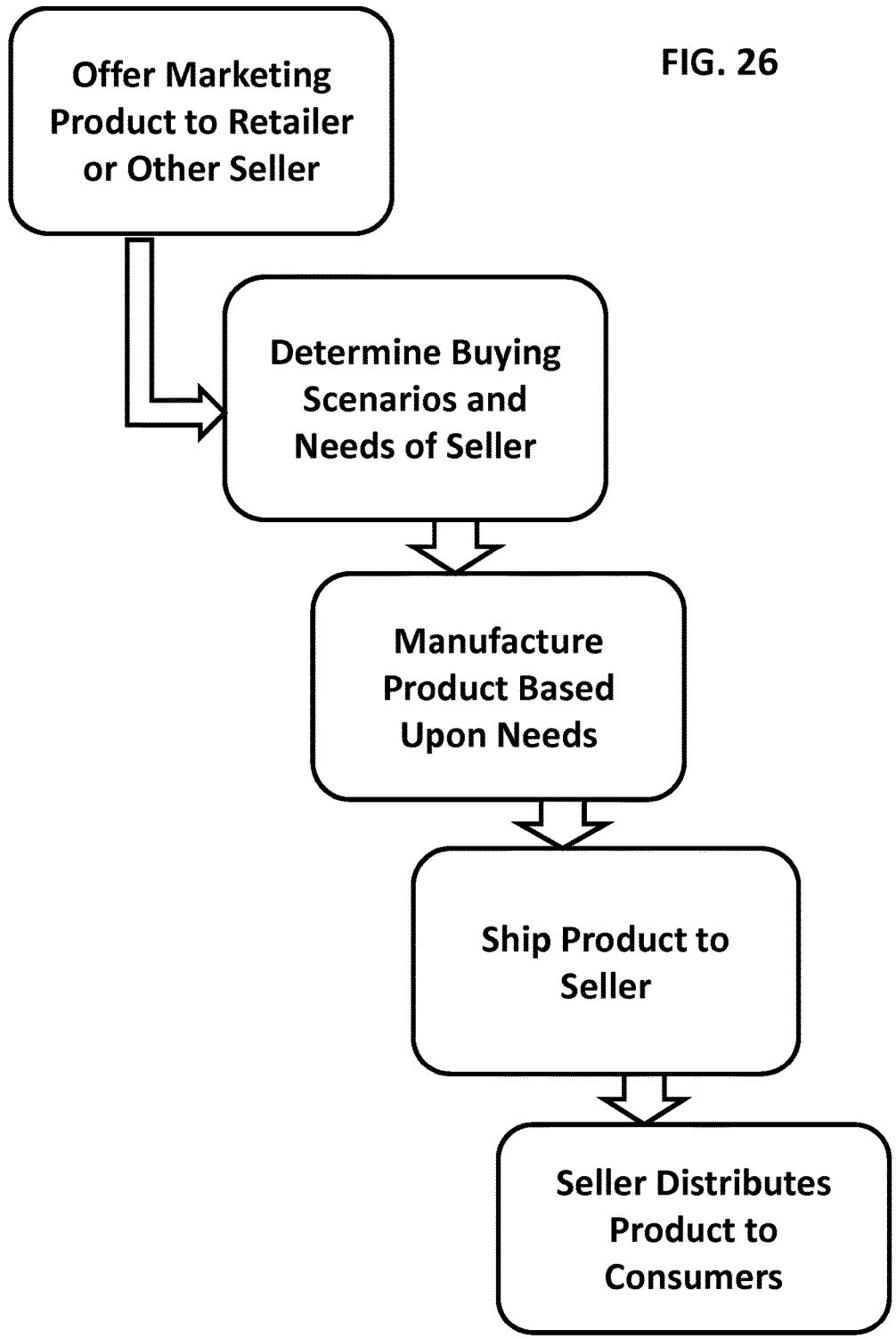
FIG. 26 depicts a flow chart of an example method according to the invention.

An example method of advertising is depicted in the flowchart of FIG. 26. This method includes presenting an offer to provide packaging materials to a seller that incorporates advertising materials according to the invention. Then the seller's buying scenarios are determined, as well as the seller's needs for packaging materials that incorporate advertising materials. Then the packaging materials are manufactured to include the advertising materials. Then the packaging materials are provided to the seller, such as by shipping them to the seller. Thereafter, the seller distributes the packaging materials, which include advertising materials, to the consumer or another party.

In connection with the different buying scenarios, some examples of buying scenarios, in the context of bags, include: 1) how many bags a typical consumer will use during a shopping trip at the check-out, 2) whether all check-out lines are the same or some lines have different shopping experiences than other lines, 3) whether an in store shopping opportunity is to be provided or an after shopping experience offer is to be offered; 4) whether the advertising will be directed to the user, or to a different entity; 5) how many offers to include on a bag 30; 6) type of offer to be offered on a bag 30; and 7) whether the user wants all bags 30 to include advertising, or only some of the bags 30, among other criteria.

In the method of applying labels 32 to the packaging material substrate, a continuous label feeding feature is desirable. During the application process, trim that surrounds the label 32 on the release liner 48 may be trimmed away and pulled back into a waste container. The waste may be pulled away using a vacuum. The labels 32 may be trimmed during the application process or can be trimmed prior to the application process. The trim or waste may be rewound on a spool if desired. Since the labels 32 are typically applied to a liner 48, the liner must be disposed of so that it does not interfere with the label application process. The liner can be rolled or vacuumed away, cut into pieces, or a combination thereof. Alternatively, a linerless label may be used. In this case, it would not be necessary to remove the liner or take it away. In this option, the label 32 may be preglued or glued in the application process. The linerless label can be die cut, cut, or sheeted prior to application. The linerless label can be dropped onto the web. Alternatively, an adhesive drop could be utilized on the web followed by the dropping of a label that is adhesive free.

Labels 32 of any size may be used, as long as they may be affectively applied to the web. In some of the examples disclosed herein, the bottom layer 98 of a multi-part label 32 may be film or paper. The film may be clear or opaque. There may be instances where the paper can be left on the bag 30, or the film is opaque and can be left on the bag 30, particularly when the film is compatible with the bag 30 from a recycling perspective.

The term advertising material is utilized herein in describing the material on the labels or coupons. Any type of media may be present on the labels or coupons and need not necessarily be advertising related in the regular sense. For example, promotion of a charity could be the advertising material at issue, or the like.

In one example a bag includes a flexible web that is shaped into the shape of a bag and a communication member attached to the flexible web with an adhesive. When the communication member is removed from the web, substantially no adhesive remains on the web.

The communication member may be paper having an adhesive applied to a lower layer thereof. A plastic film may be coupled between the paper and the adhesive, with the paper being coupled to the plastic film by an adhesive. The communication member may also include printing applied to at least one of the top and bottom surfaces of the paper. The adhesive may be one or more of ultra-removable, removable, semi-permanent, or permanent and the adhesive is one or more of patterned, solid, or deadened. The web may have at least a top surface and a bottom surface, and the communication member is applied to one of the top surface or the bottom surface of the web. The web may be formed into the shape of a bag having gusseted side surfaces, and the communication member is applied to the bag in the vicinity of or in the gusseted side surfaces. Alternatively, the communication member may be applied to the web between the gusseted side surfaces.

The top surface of the web may have three sections, including two side edge sections and a center section. The communication member may be applied in one or more of the center section and the side edge sections. The bag may have a bottom portion and the communication member is applied to the bottom portion. The communication member may be one of a single-layer coupon, a multi-layered coupon, a single-layer label, a multi-layer label, a multi-page communication piece, an encapsulating packet, a scented packet, or a combination thereof. The communication member may include a magnet or may trap a product or package.

The multi-layered coupon or multi-layer label may include a base layer, a top layer, a first adhesive positioned adjacent the base layer, and a second adhesive positioned between the base layer and the top layer. The first adhesive may be an ultra-removable adhesive and the second adhesive is non-sticky. The communication member may have printing on a first side and a second side thereof.

The bag may include a handle and the communication member is positioned on the bag in a position so that it does not interfere with the handle. The handle may be formed by a handle cut-out area and the bag has side gussets that extend along the length of the bag. The communication member may be positioned on a surface of the bag between the gussets and within the handle-cut out area such that when the bag is folded in half for shipping. The communication member may be positioned between the gussets and within the handle cut-out area. The flexible web may be one or more of paper, plastic, or a combination thereof and the communication member may be one or more of paper, plastic, or a combination thereof.

An example advertising medium includes a packaging material made of a first material and a communication member applied to the packaging material. The communication member has a first part that is positioned directly adjacent the packaging material and a second part positioned on the first part. The second part is made of the same material or a different material as the first part. One or both of the first part and second part are removable from the packaging material without substantially marring the surface of the packaging material.

The first part of the advertising medium may be made of the first material and the second part may be paper. The first part may be made of paper. The first part may be a film and the second part may be paper. The film may have wings that couple the paper to the packaging material, with the paper being removable from the packaging material and the wings remaining on the packaging material. The packaging material may be a plastic bag made of HDPE, LDPE or a combination thereof. The first part of the communication member may be a plastic substrate made of HDPE, and the second part may be a paper stock. The plastic substrate may have an ultra-removable adhesive applied between the plastic bag and a lower surface of the plastic layer such that the plastic layer is removable from the plastic bag.

The packaging material may be a corrugated cardboard or paper box, with the first part being a paper layer and the second part being a paper stock. The first part may be made of HDPE and the second part may be made of HDPE. The first material may be HDPE. The communication member may be a single-layer coupon, a multi-layered coupon, a single-layer label, a multi-layer label, a multi-page communication piece, an encapsulating packet, a scented packet, or a combination thereof.

An ultra-removable adhesive may be positioned between the first part and the packaging material. A dry adhesive may be positioned between the first part and the second part such that the second part may be removable from the first part. The communication member may be positioned on an outwardly facing prominent surface of the packaging material in order to insure that shoppers see it. The communication member may be a vehicle for providing marketing communication on a packaging material.

In another embodiment, a method of applying a communication member carrying information to a packaging material includes feeding a packaging material in a first direction and applying a communication member to a surface of the packaging material with an adhesive. Both the communication member and the adhesive are simultaneously removable from the packaging material by a user such that substantially no adhesive residue remains on the bag upon communication member removal.

The packaging material may be individual packing material pieces. The packaging material may be a continuous web of material and may also include cutting the web to form the shape of the finished packaging material. The applying and cutting steps may occur substantially simultaneously, or the applying and cutting steps may occur at different times. The communication member may have at least a top layer and a bottom layer and the bottom layer remains on the bag and is recyclable with the bag.

The method may also include registering the web so that the communication member may be applied at a desired location on the packaging material. The web may be stationary or moving during the applying step. The method may also include feeding a web of communication members to the packaging material, or feeding singulated pieces to the packaging material.

The feeding step may include feeding multiple webs of packaging material stock and the applying step may include applying multiple communication members, with the applying step occurring on each web of packaging material stock. The applying a communication member step may be performed using a label applicator, and the packaging material may be a box blank, envelope, or a bag. The communication member may be a single-layer coupon, a multi-layer coupon, a single-layer label, a multi-layer label, a multi-page communication piece, an encapsulated packet, a scented packet, or a combination thereof.

In another embodiment, a method of using a communication member that is applied to a packaging material to advertise to a consumer at a venue includes offering a marketing product to a seller, determining the advertising scenarios present in the venue and the needs of the seller based upon the advertising scenarios of the venue, manufacturing a plurality of communication members based upon the needs of the venue and applying the communication members to packaging materials that will be used in the venue, and supplying the packaging materials having communication members to the venue.

The method may also include distributing at least one of the packaging materials having communication members to a consumer. The communication member may be visible to a consumer before they exit the venue. The seller may be a retailer.

The advertising scenarios may include at least one of: an in-store advertising scenario, a return-to-the store advertising scenario, an out-of-store advertising scenario, an online advertising scenario, and a charitable advertising scenario. The advertising scenario may be a buying scenario. The advertising scenarios of the venue may include: determining the type of packaging materials needed at the venue, and determining the frequency of application of communications members to the packaging materials.

More than one type of packaging material may be used at the venue at multiple locations within the venue.

The determining the frequency of application of communication members to the packaging materials may include selecting one of the following: application of the same communication member to all packaging materials, application of the same communication members to some of the packaging materials, with spacing between packaging materials that receive the communication member, application of different communication members to all packaging materials in sequential repeating order, and application of different communication members to some of the packaging materials, with spacing provided between packaging materials that receive and do not receive a communication member. The advertising scenarios may also include determining the type of communication member needed including determining the number of layers and the type of adhesive.

The method may also include providing advertising material on the communication member. The advertising material may be varied or targeted. The method may include offering incentives to the seller to offer the communication member to consumers. The communication member may be a portable, dimensional advertising media that can be removed from the packaging material.

According to another embodiment, a system for applying a communication member on a packaging material that is transported on a packaging material line includes a label applicator and a supply of communication members. The label applicator is positioned in the vicinity of a surface of the packaging material for applying communication members to the packaging material. The supply of communication members is positioned in communication with the label applicator. The communication members are one of positioned on and removable from a liner, or the communication members are linerless.

The packaging material may be a web of packaging materials that is continuously moving and the label applicator applies labels in a continuous manner without stopping the packaging material line to reload the supply of communication members. The packaging material may be a plurality of singulated pieces transported on a packaging material line in a continuous manner and the label applicator applies labels in a continuous manner without stopping the packaging material line to reload the supply of communication members. The communication members may be positioned on and removable from a liner.

A mechanism for taking away the liner may also be provided. The mechanism for taking away the liner may be one of a spindle for winding the liner or a vacuum system for transporting the liner away.

The system may also include a means for registering the communication members with the web in order to properly position the communication members on the web. The label applicator may be positioned over the web and the label applicator applies the communication members downwardly. The communication members may be blow downwardly by a blow box that may be associated with the label applicator. The supply of communication members may be fan-folded and positioned in boxes. The system may also include a platform for positioning one or more boxes in the vicinity of the label applicator. The platform may be positioned above the label applicator.

Multiple packaging material lines may be provided, and a label applicator and a supply of communication members may be associated with each of the packaging material lines. The packaging material line may be a bag making line and the communication members are one or more of a single-layer coupon, a multi-layered coupon, a single-layer label, a multi-layer label, a multi-page communication piece, an encapsulating packet, a scented packet, or a combination thereof. The mechanism for taking away the liner may be a vacuum system for transporting the liner away to a remote location.

The term "substantially," if used herein, is a term of estimation.

While various features are presented above, it should be understood that the features may be used singly or in any combination thereof. Further, it should be understood that variations and modifications may occur to those skilled in the art to which the claimed examples pertain. The examples described herein are exemplary. The disclosure may enable those skilled in the art to make and use alternative designs having alternative elements that likewise correspond to the elements recited in the claims. The intended scope may thus include other examples that do not differ or that insubstantially differ from the literal language of the claims. The scope of the disclosure is accordingly defined as set forth in the appended claims.

What is claimed is:

1. A method of applying communication members to bags comprising:
   feeding the bags along a production line; and
   applying the communication members to surfaces of the bags with an adhesive while the bags are on the production line,
   wherein the communication members and the adhesive are simultaneously removable from the bags such that substantially no adhesive residue or recess remains on the bags upon removal of the communication members.

2. The method of claim 1, wherein at least 300 communication members are applied to the bags each minute.

3. The method of claim 1, wherein the bags are fed along at least a part of the production line as a continuous web of material.

4. The method of claim 1, wherein tension of the bags is increased at a point in the production line where the communication members are applied to the bags.

5. The method of claim 1, wherein the adhesive is an ultra-removable adhesive.

6. The method of claim 1, further comprising registering the bags and sensing a registered location on the bags so that the communication members are applied at a desired location on the bags.

7. The method of claim 1, wherein the communication members are applied to the bags while the bags are moving along the production line.

8. The method of claim 1, wherein the bags are made of polyethylene or polypropylene.

9. The method of claim 1, wherein the applying step is performed at a point in the production line in which the bags are no longer fed through turns of the production line.

10. The method of claim 1, wherein the applying step is performed using a label applicator that applies the communication members to the bags with forced air pressure.

11. The method of claim 1, wherein the communication members are a single-layer coupon, a multi-layer coupon, a single-layer label, a multi-layer label, a multi-page communication piece, an encapsulated packet, a scented packet, or a combination thereof.

12. A method of applying communication members to plastic bags comprising:
   feeding the plastic bags along a production line, the plastic bags being formed as a continuous web of material;
   applying, with a forced air applicator, the communication members to the plastic bags with an ultra-removable adhesive while the plastic bags are fed along on the production line,
   wherein the communication members and the adhesive are simultaneously removable from the plastic bags such that substantially no adhesive residue or recess remains on the bags upon removal of the communication members, and
   wherein at least 300 communication members are applied to the plastic bags each minute.

* * * * *